United States Patent [19]

Okabe

[11] 3,833,924

[45] Sept. 3, 1974

[54] ROTARY HEAD APPARATUS WITH DYNAMIC AIR BEARINGS HAVING CERAMIC COATINGS

[75] Inventor: Koichi Okabe, Tokyo, Japan

[73] Assignee: Shiba Electric Co., Ltd., Tokyo, Japan

[22] Filed: Oct. 27, 1972

[21] Appl. No.: 301,264

[30] Foreign Application Priority Data

Oct. 30, 1971 Japan.............................. 46-101025

[52] U.S. Cl............. 360/107, 308/238, 308/DIG. 1, 360/84

[51] Int. Cl. ... G11b 5/52, G11b 21/04, F16c 33/20

[58] Field of Search........ 179/100.2 T; 308/238, 37, 308/DIG. 1

[56] References Cited

UNITED STATES PATENTS

| | | | |
|---|---|---|---|
| 2,745,437 | 5/1956 | Comstock | 308/238 |
| 3,037,828 | 6/1962 | Michael | 308/238 |
| 3,414,683 | 12/1968 | Dolby | 179/100.2 T |
| 3,420,964 | 1/1969 | Haas | 179/100.2 T |
| 3,435,154 | 3/1969 | Kihara | 179/100.2 T |
| 3,535,006 | 10/1970 | Orkin et al. | 308/238 |
| 3,591,732 | 7/1971 | Prochnow | 179/100.2 T |
| 3,652,808 | 3/1972 | Esterly et al. | 179/100.2 T |

*Primary Examiner*—Bernard Konick
*Assistant Examiner*—Robert S. Tupper
*Attorney, Agent, or Firm*—Dike, Bronstein, Roberts, Cushman & Pfund

[57] ABSTRACT

In apparatus for driving a head drum of a broadcasting video tape recorder comprising an electric motor including a stator and a rotor, a head drum mounted on the rotor, and radial and thrust bearings between the stationary and rotary members of the apparatus, ceramic coatings having a thickness of 10 to 100 microns are applied to the radial and thrust bearing surfaces, the bearings are operated as dynamic air pressure bearings, and a load of less than 0.15 Kg/cm$^2$ is applied on the radial bearing.

3 Claims, 4 Drawing Figures

ROTARY HEAD APPARATUS WITH DYNAMIC AIR BEARINGS HAVING CERAMIC COATINGS

BACKGROUND OF THE INVENTION

This invention relates to apparatus for driving a head drum of a video tape recorder (VTR) for use in broadcasting services.

Such apparatus is used to drive a head drum provided with head tips for magnetic recording on the peripheral surface thereof at a high speed of 14,400 r.p.m., for example, whereby to record and reproduce video signals to and from a magnetic tape which is disposed close to the head tips and moved in a direction perpendicular to the direction of rotation of the drum.

As shown in FIG. 1 of the accompanying drawing, a prior art apparatus for driving the head drum of a broadcasting video tape recorder comprises a stationary plate 1 having a cross-section of a letter L and a head drum driving apparatus 2 which is secured to the vertical leg of the plate 1 by means of a band 3 which is secured by screws 11 and 12. The head drum driving apparatus 2 includes a cylindrical frame 4 for receiving a hollow stator 5, the opposite ends thereof being secured to hollow sleeves 6*a* and 6*b* respectively. A rotor 7 is provided to extend through hollow stator 5 and hollow sleeves 6*a* and 6*b* and a tone wheel 8 having a magnet for detecting the number of revolutions and a head drum 10 provided with a plurality of head tips 9 are mounted on the opposite ends of the rotor shaft. The tone wheel 8 and head drum 10 cooperate with the end surfaces of sleeves 6*a* and 6*b* respectively to form thrust bearings for preventing axial movement of the rotor 7.

When alternating current is passed through a winding wound upon stator 5, the rotor 7 rotates to drive head drum 10 at a high speed, say 14,400 r.p.m. for recording or reproducing video signals. Since it is necessary to accurately record the video signals on a recording tape which is moved along a cylindrical surface about the axis of the rotation of the rotor, the head drum driving apparatus is required to have an extremely high accuracy, that is, extremely small variations in the eccentricity and speed. For this reason, high precision ball bearings and static pressure air bearings have been used in the prior art driving apparatus.

However, ball bearings require use of suitable lubricant such as grease and their useful life is limited by the accuracy of rotation. In addition, the rotation and revolution of the bearing balls generate a high frequency variation in the rotating speed causing so-called water fall and chromatic flicker in the reproduced picture of the television receiver.

When compared with the ball bearing, the static pressure air bearing is advantageous in that its accuracy of rotation is high, that the tendency of generating a high frequency variation in speed is small and that the maintenance is easy. However, the air bearing requires a relatively expensive source of compressed air, such as an air compressor, which requires constant maintenance and occupies a substantial space. Further, the source of compressed air acts as sources of heat, noise and vibration. Moreover, it is necessary to form air conduits 13 and 14 through sleeves 6*a* and 6*b* which act as bearings thus complicating the construction.

Recently, there is a requirement for mounting a broadcasting VTR on a vehicle has arisen, thus providing a movable station, but the above described drum head driving apparatus utilizing air bearings is not suitable for such application because air bearings require an air compressor, pipings for the compressed air, and a control system for the compressed air, thus complicating the construction.

SUMMARY OF THE INVENTION

An object of this invention is to provide an improved head drum driving apparatus of high accuracy of rotation.

Another object of this invention is to provide a new and improved head drum driving apparatus which can be readily manipulated in the same manner as the conventional head driving apparatus using ball bearings.

Yet another object of this invention is to provide an improved head drum driving apparatus durable in the presence of frequent starting and stopping operations.

According to this invention there is provided apparatus for driving a head drum of a broadcasting video tape recorder comprising an electric motor including a stator and a rotor, a head drum mounted on the rotor, and radial and thrust bearings between the stationary and rotary members of the apparatus, characterized in that ceramic coatings are applied to the radial and thrust bearing surfaces, that the ceramic coatings have a thickness of 10 to 100 microns, that a load of less than 0.15 $Kg/cm^2$ is applied upon the radial bearing, and that the radial and thrust bearings are operated as dynamic pressure air bearings.

DESCRIPTION OF THE PREFERRED EMBODIMENT

Figure 1:
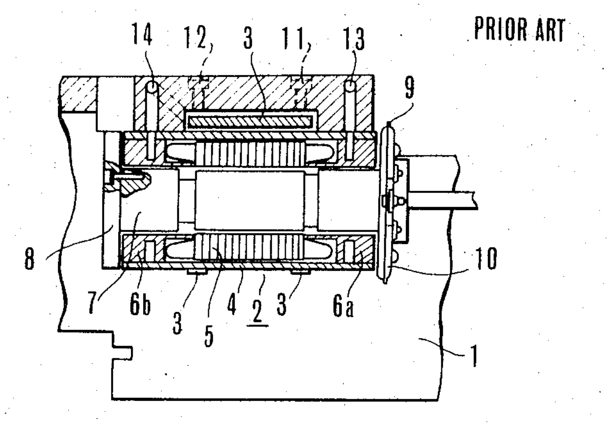
FIG. 1 shows a longitudinal sectional view of a prior art head drum driving apparatus utilizing static pressure air bearings.
Figure 2:
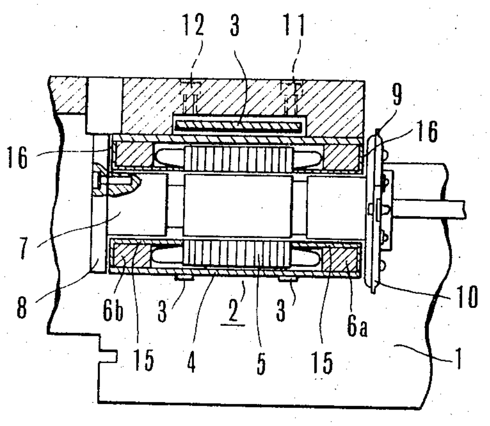
FIG. 2 shows a longitudinal sectional view of one example of the novel head drum driving apparatus of this invention utilizing dynamic pressure air bearings.

In FIG. 2, which illustrates a preferred embodiment of this invention, the component parts identical to those shown in FIG. 1 are designated by the same reference numerals. The construction of the embodiment shown in FIG. 2 is generally similar to that shown in FIG. 1 except that the peripheral surface 15 and the end surfaces 16 of the sleeves 6*a* and 6*b* which act as radial and thrust bearings are provided with ceramic coatings. Usually a conventional VTR is started and stopped about 30 times a day so that if dynamic pressure bearings are used for the head drum driving apparatus, due to solid-to-solid contact between the stationary and rotary members of the apparatus, the wear of the bearing surfaces becomes excessive thereby decreasing the accuracy of rotation and the useful life of the apparatus.

However, when the load applied on the radial bearings is set to be less than 0.15 $Kg/cm^2$ for the purpose of realizing substantially the same lock-in time as that of the prior art head drum driving apparatus, the load variation of the head drum driving apparatus would be decreased to an extremely small value of about 20 g, whereby the mass ratio between the head drum 10 and the rotor 7 should be made to be smaller than 1:6. The ceramic coatings applied to the bearing surfaces and the end or thrust surfaces 16 provide sufficient strength to withstand frequent starting and stopping.

As an example, molten alumina ceramic was sprayed upon the periphery and end surfaces of sleeves *6a* and *6b* and then the applied coatings were ground to form alumina ceramic coatings of 50 to 80 microns thick. After start-stop cycles of more than 25,000 under the same load condition as above described no change in the accuracy was noted except that a small polished surface was formed. The error of the reproduced television signal (VPS) was maintained at a constant value of about 0.07 $\mu$s and the lock-in time was about 3 seconds. Thus, the head drum driving apparatus of this invention has an excellent operating characteristic and maintains its accuracy over a long period.

Because the surface of the as formed ceramic coating is coarse it is advantageous to grind it to obtain accurate dimensions. Further, the grain size of the ceramic coating in the layer near the surface of the coating is coarse, so that it is preferable to reduce the thickness of the ceramic coating formed by molten spray from about 150 microns to about 50 to 80 microns by grinding so as to obtain a ceramic coating of fine grains. However, a ceramic coating having a thickness of from 10 to 100 microns is generally suitable for use as a dynamic pressure bearing.

While in the above example, the ceramic coating was formed by spraying molten ceramic, it is also possible to form the ceramic coating by other method.

As an example, a powder of alumina is heated to a temperature of 3,300°C by oxy-acetylene flame and the molten alumina is sprayed at a speed of 760 m/sec.

Although alumina ceramic is most preferred from the stand point of hardness and heat resistance property, powders of chromium oxide, titanium oxide, tungsten carbide, stellite and hard alloys for preparing cutting tools are also satisfactory.

Instead of forming the ceramic coating by spraying molten metal or ceramic, it is also possible to bond films of such ceramics to the bearing surfaces.

Figure 2B:
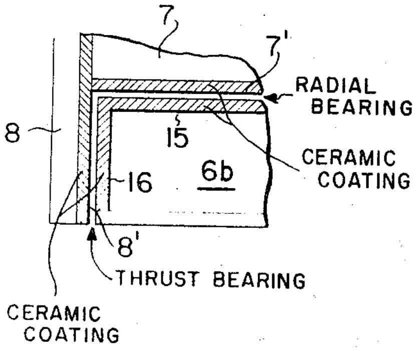
FIGS. 2A and 2B are fragmentary views of portions of FIG. 2 showing a modification.
Figure 2A:
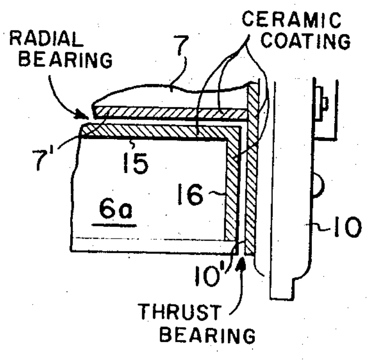

Further, it will be clear that the ceramic coatings may be formed on the rotary members of the radial and thrust bearings, that is on the periphery 7' of the rotor ends and the inner surfaces 10' of the head drum and tone 8' wheel as shown respectively in FIGS. 2A and 2B.

As above described the novel head drum driving apparatus of this invention utilizing dynamic pressure air bearings can eliminate the provision of any external source of high pressure air, eliminate high frequency vibrations which are generated in the driving apparatus utilizing ball bearings and does not require any lubricant. Moreover, the novel driving apparatus has an extremely high accuracy of rotation, and can withstand frequent start and stop operations under normal operating conditions.

What is claimed is:

1. A rotary head apparatus for broadcast video tape recorder comprising:

a housing having a central bore and a pair of coaxial sleeves having bearing surfaces;

an electric motor mounted in said bore, said motor including a stator and a rotor, said stator being mounted between said coaxial sleeves;

a rotary head drum having at least one magnetic transducing head mounted at one end of said rotor;

a tone wheel mounted on the other end of said rotor;

radial dynamic air bearing means for supporting said rotor wherein said sleeves cooperate with portions of said rotor to form radial bearing means;

thrust dynamic air bearing means for limiting axial movement of said rotor wherein a portion of said head drum and the end surface of one of said sleeves opposed thereto cooperate to form a first thrust bearing and a portion of said tone wheel and the end surface of the other of said sleeves opposed thereto cooperate to form a second thrust bearing;

said radial and thrust bearing means having at least one bearing surface coated with a ceramic having a thickness of 10 to 100 microns, the load of said radial bearing means being limited to 0.15 Kg/cm².

2. The apparatus according to claim 1 wherein said ceramic coatings comprise alumina ceramic coatings formed by spraying molten alumina.

3. Apparatus according to claim 1 in which said portions of said rotor, said portion of said head drum and said portion of said tone wheel are coated with said ceramic coatings.

* * * * *